July 18, 1967

F. R. TIETGE 3,331,267

WRENCH HAVING A REDUCED PORTION WHICH
FAILS AT THE DESIRED TORQUE

Filed Aug. 30, 1965

INVENTOR.
FRED R. TIETGE
BY
Carl R. Brown
ATTORNEY

United States Patent Office 3,331,267
Patented July 18, 1967

3,331,267
WRENCH HAVING A REDUCED PORTION WHICH FAILS AT THE DESIRED TORQUE
Fred R. Tietge, 3963 Mount Blackburn, San Diego, Calif. 92111
Filed Aug. 30, 1965, Ser. No. 483,461
6 Claims. (Cl. 81—52.4)

This invention relates to a torquing tool and more particularly to a torquing wrench for applying a determinable amount of torque to a bolt, nut, connector or the like by twisting off a portion of the torquing tool when the desired magnitude of wrenching torque has been applied.

There are several prior art devices that use the twisting off of a reduced in diameter portion of a bolt or nut to attempt to establish the amount of torque applied to the bolt or nut. Because these prior art devices use a different from normal bolt or nut construction or configuration, the bolts or nuts must be especially made and in many and diverse forms. This, of course, seriously limits wide use of this type of torquing bolts or nuts, since to do so would require a much larger expense for the unique bolts and nuts and a larger inventory. In considering the foregoing and the many different torques required and the many different sizes and designs of bolts, nuts, and the like, it is evident that a large multiple of various size and type of bolts and nuts and torquing magnitudes must be made to provide torquing fasteners for general use.

Industry normally uses standard nuts and bolts that have given specifications, which standard units they buy in large quantities. Because other industries do the same, it is possible to mass produce the standard nuts and bolts and to thus reduce their cost considerably. In other environments, special types of bolts, such as for example a stainless steel bolt having a military specification, have to be purchased to do a particular job. In both instances modifying the bolts and nuts themselves to provide torquing determination, incurs considerable expense and requires maintaining large supplies of different kinds and sizes of bolts and nuts.

Still further the bolts and nuts with the foregoing described slot construction, as is known in the art, often bend at the slot when torqued. When this occurs, then a bending stress in addition to the torquing stress, is applied to the reduced diameter section and thus causes variation in the magnitude of twisting torque required to twist off the reduced diameter portion. This can cause inaccuracies in determining the exact torquing force applied.

In view of the limitations of the prior art, it is therefore an object of this invention to provide a novel and improved torquing tool.

It is another object of this invention to provide a novel and improved torquing tool that is capable of torquing standard bolts and nuts and other standard type connectors.

It is another object of this invention to provide a novel and improved torquing tool with a reduced diameter section, that is not a part of the fastener.

It is another object of this invention to provide a novel and improved torquing tool that is inexpensive, accurate, and has universal application.

It is another object of this invention to provide an inexpensive, novel and improved torquing tool that may be used to recheck previous torque setting of bolts, nuts and other such connectors.

It is another object of this invention to provide a new and improved torquing tool having improved accuracies in establishing the exact magnitude of the twisting torque applied.

My invention accomplishes the foregoing as well as other improvements and advancements in the art by utilizing socket type wrenching tools that fit all standard type bolt heads, nuts and connectors regardless of from what type of metal they are made. The socket has a projection member projecting from one end. The projection member has a shape corresponding to wrenches that may be used to turn the projection and socket. The other end of the projection is inserted into the socket and fixed thereto. The projection has a radial slot therein that reduces the diameter of the projection and thus allows the establishment of a pre-determined twisting torque that must be applied by the wrench to the projection member before the projection twists off from the socket. The radial slot portion may be adjacent the point of connection of the projection member to the socket. This tends to increase the lateral stability of the projection member when torque is applied to the end of the projection member to rotate the socket and the connector. The slot void may be filled with any suitable filler material such as solder, a rigid plastic, a Teflon washer, or the like. Teflon is particularly advantageous since it has a smooth surface that provides substantially frictionless contact with the sides of the slot. The purpose of the filler material is to prevent the slot from decreasing in width, which would allow bending of the projection at the point of the slot during the application of torque. The solder may be applied in a manner that will assure a substantially frictionless surface with the sides of the slot, such as for example, by applying a light oil film to the sides of the slot prior to filling the slot with solder. In addition, the width of the slot may be reduced by applying force to both ends of the projection member. This may be accomplished by a "coining operation."

Since the torquing tool of this invention is not itself a fastener but rather a wrenching tool, it can be used to tighten any type of mass produced connector, bolt or nut or special purpose connector, bolt or nut. Thus the torquing tool can be made in a limited number of sizes that correspond to the head size of the bolts or nuts. The torquing tool may be made of two parts joined together by using simple and relatively inexpensive manufacturing techniques. With the groove filled with filler material or reduced in width by "coining" to eliminate bending, then the magnitude of pure torque applied may be more accurately established. Thus the torquing tool of my invention is inexpensive, can be made more accurate, can be used on any bolt head, nut or connector and thus has universal application, can be used to torque nuts or bolts that have already been previously torqued thus providing a recheck to verify previous torque settings, and as a standard unit can be used on any special type bolt or connector.

Other objects and many advantages of my invention will be more apparent from the following specification, claims and drawings in which:

Figure 1:
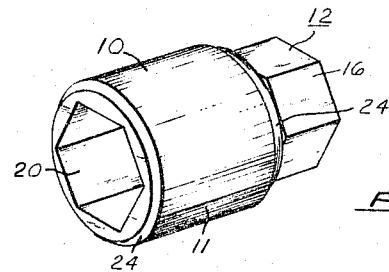
FIGURE 1 is a perspective view of an embodiment of my invention.

Referring now to FIGURE 1, the specific embodiment of my invention has a socket 10 with a substantially cylindrical outer surface, an inner surface 20 and which socket is open at both ends. The internal shape of the socket corresponds to the head configuration bolts, nuts and connectors to be torqued.

Figure 2:
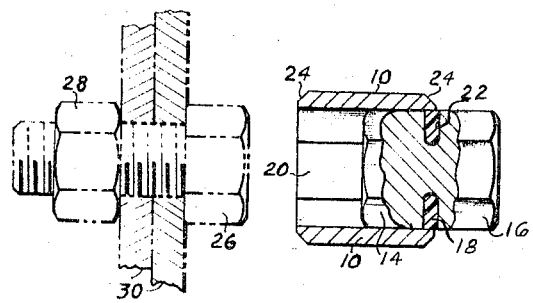
FIGURE 2 is a view partly in section of an embodiment of the torquing tool of this invention with a connector in phantom and adjacent thereto that may be torqued by the torquing tool.
Figure 3:
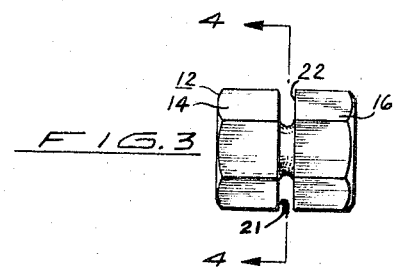
FIGURE 3 is a side view of the projection member of this invention with a radial slot therein.

A projection member 12, (see FIGURE 3) has an outer configuration with the same size and shape as the internal surface 20 of the socket member 10. The projection member 12 also has a radial slot 18 cut therein that divides the projection member 12 into two portions 14 and 16. The end portion 14 is inserted into one end of the socket means 10, as shown in FIGURE 2, and is fixed to the socket by any of several known means such as by a shrink fit, coining, welding, or the like. Generally the slot 18 will be immediately adjacent the end of the socket after the mating of the two members as shown in FIGURE 2.

Figure 4:
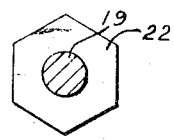
FIGURE 4 is a view taken along lines 4—4 of FIGURE 3.

FIGURE 4 shows in cross section the center portion 19 of the slot 18. The reduced diameter portion 19 is made of metal having known characteristics and parameters that will twist off with a given magnitude of applied torque. Thus its cross-sectional dimension establishes the torquing valve of the torquing tool. The distance between the sides 21 of the slot 18 are normally such, in prior art devices, that bending is likely to occur in portion 19 when torque is applied in the normal manner. This bending varys the force required in torquing the projection member to failure and can thus lead to incorrect or varying torque magnitudes having to be applied to the torquing tool to obtain failure. In my invention, this space may be filled with solder, a plastic washer, plastic molded into the slot 18 or the like. When using these filler means, the filler material is so applied that there is little friction between the sides 21 of the slot and the filler material, not withstanding that there is complete occupancy of the gap between the sides of the slot by the filler material. Thus the filler material is capable of preventing bending action of the projection member at the point of the slot during application of torque and yet does not create a large increase in friction that could cause variation in the maximum torquing force.

As shown in FIGURES 1 and 2, the tool may be made of two parts; such as, for example the projection member may be made of hexagonal bar stock from which appropriate size lengths are cut and the slot 18 cut therein by a screw machine. The socket can be extruded or cast in long bars with a mandrel therein making the internal shape and with the correct length cut off with a screw machine. The two members may then be joined together as previously described. The groove may also be reduced in width by coining or by other like methods of forming that forces the sides of the grooves closer together.

In operation, the torquing tool is applied to a connector such as a bolt 26 (see FIGURE 2) that is used to join plates 30. A normal wrenching device such as another socket or wrench is applied to the end 16 with the internal surface 20 of the socket being fitted on to the head of the bolt 26. The torquing nut is then turned in the normal fashion until the portion 16 of the projection member is twisted off. The torquing tool may be applied to any type bolt head or nut and may be repeatedly so applied.

It is to be understood, of course, that may invention is not limited to the specific embodiments disclosed but only by the following claims.

What I claim is:

1. A torquing tool comprising,
   socket wrench means for torquing connectors,
   said socket wrench means having a projection at one end for rotating said socket wrench means,
   said projection having a radial slot therein for reducing the diameter of said projection and set the magnitude of twist off torque of said projection,
   and filler means in said slot for substantially preventing lateral bending of said projection at said slot during torquing.

2. A torquing tool comprising,
   socket wrench means for torquing connectors,
   said socket wrench means having a projection at one end for rotating said socket,
   said projection having a radial slot therein for setting the magnitude of twist off torque of said projection,
   filler means in said slot for substantially preventing lateral bending of said projection at said slot during torquing,
   and said filler means presenting a substantially frictionless surface to said slot.

3. A torquing tool comprising,
   socket wrench means for torquing connectors,
   said socket wrench means having a projection at one end for rotating said socket with a predetermined magnitude of torque,
   said projection having a narrow radial slot therein for setting the magnitude of twist off torque of said projection,
   and the sides of said slot being immediately adjacent each other and being separated by only that amount necessary to avoid excessive frictional contact therebetween for preventing bending of said projection at said slot during said torquing.

4. A torquing tool comprising,
   socket wrench means for torquing bolts, nuts and the like,
   said socket wrench means having a projection at one end with an inner configuration corresponding to the outer surface of said bolts, nuts and the like,
   said projection having a radial slot therein for reducing the magnitude of twist off torque of said projection,
   filler means in said slot for substantially preventing lateral bending of said projection at said slot during torquing,
   and said filler means being substantially nonadhering to the walls of said slot.

5. A torquing tool for applying a predetermined amount of torque to connectors comprising,
   a socket wrench means being open at both ends for torquing said connectors,
   a bar member having the same outside diameter and configuration as the inside diameter and configuration of said socket wrench means,
   said bar member having a radial slot midway its length,
   one end of said bar member being inserted into one end of said socket wrench and being fixed thereto,
   and the space in said slot between the sides thereof being filled with Teflon with nonadhering surfaces facing said sides.

6. A torquing tool for applying a predetermined amount of torque to bolts and nuts comprising,
   socket wrench means being open at both ends for torquing said bolts and nuts,
   bar member means for fitting inside one end of said socket wrench means and having an outer configuration the same as the outer configuration of said bolts and nuts,
   said bar member having a narrow radial slot midway its length and adjacent said socket wrench means,
   said slot reducing the diameter of said bar member a given amount for setting a predetermined magnitude of twist off torque for said reduced diameter portion,
   and the sides of said slot being immediately adjacent each other and being separated by only that amount necessary to avoid excessive frictional contact therebetween to thereby reduce to the maximum the length of said reduced diameter portion of said bar member for preventing bending of said projection at said slot during torquing said bolts and nuts.

References Cited

UNITED STATES PATENTS

| | | |
|---|---|---|
| 881,075 | 3/1908 | Hosking. |
| 1,328,087 | 1/1920 | LeChot. |
| 1,711,694 | 5/1929 | Saffold. |
| 1,776,525 | 8/1930 | Talbot _____ 64—28 |
| 2,409,385 | 10/1946 | Pletcher _____ 81—52.4 |
| 3,160,188 | 12/1964 | Frank _____ 85—61 X |
| 3,191,486 | 6/1965 | Gibbens _____ 81—52.4 X |
| 3,224,316 | 12/1965 | Grikscheit et al. _____ 85—62 |

WILLIAM FELDMAN, *Primary Examiner.*

MILTON S. MEHR, *Examiner.*